United States Patent
Wall et al.

(10) Patent No.: US 9,540,975 B2
(45) Date of Patent: Jan. 10, 2017

(54) OIL MIST SEPARATOR

(71) Applicant: GE Jenbacher GmbH & Co OG, Jenbach (AT)

(72) Inventors: Guenther Wall, Bad Haering (AT); Johannes Laubach, Weer (AT); Wolfgang Madl, Axams (AT); Thomas Trenkwalder, Absam (AT)

(73) Assignee: GE JENBACHER GMBH & CO OG, Jenbach (AT)

( * ) Notice: Subject to any disclaimer, the term of this patent is extended or adjusted under 35 U.S.C. 154(b) by 83 days.

(21) Appl. No.: 14/506,981

(22) Filed: Oct. 6, 2014

(65) Prior Publication Data

US 2015/0096510 A1  Apr. 9, 2015

(30) Foreign Application Priority Data

Oct. 8, 2013 (AT) .................. A 773/2013

(51) Int. Cl.
*F01M 13/04* (2006.01)
*B01D 45/08* (2006.01)
*B01D 46/00* (2006.01)

(52) U.S. Cl.
CPC .............. *F01M 13/04* (2013.01); *B01D 45/08* (2013.01); *B01D 46/003* (2013.01);
(Continued)

(58) Field of Classification Search
CPC ............ F01M 13/04; F01M 2013/0438; F01M 2013/0433; F01M 2013/0422; F01M 13/00; F01M 2013/0488; F01M 2013/0461; F01M 13/0033; F01M 13/0405; F01M 11/03; B01D 46/10; B01D 46/2411; B01D 2275/10; B01D 46/003
(Continued)

(56) References Cited

U.S. PATENT DOCUMENTS

| 4,289,583 A | 9/1981 | Engel |
| 6,290,738 B1 | 9/2001 | Holm |

(Continued)

FOREIGN PATENT DOCUMENTS

| CN | 201198776 | 2/2009 |
| CN | 101457680 | 6/2009 |

(Continued)

OTHER PUBLICATIONS

Austrian Patent Office Search Report (ASR) issued Mar. 20, 2014 in Austrian Patent Application No. A 773/2013.
(Continued)

*Primary Examiner* — Long T Tran
(74) *Attorney, Agent, or Firm* — Wenderoth, Lind & Ponack, L.L.P.

(57) ABSTRACT

An oil mist separator includes at least one filter device for separating off liquid suspended particles from a carrier gas. The filter device includes a housing having at least one inlet opening for introducing the carrier gas and at least one outlet opening for discharging the filtered carrier gas. Arranged in the housing is at least one filter insert through which the carrier gas can flow along a flow direction. There is also provided at least one guide device by which the flow path can be deflected. The at least one filter device can be arranged releasably in the oil mist separator, and a seal is provided preferably between a first fixing surface of the oil mist separator and a second fixing surface, to be fixed thereto, of the filter device.

20 Claims, 4 Drawing Sheets

(52) U.S. Cl.
CPC . *B01D 46/0023* (2013.01); *F01M 2013/0433* (2013.01); *F01M 2013/0438* (2013.01); *F01M 2013/0461* (2013.01)

(58) Field of Classification Search
USPC ...... 123/572, 573, 196 A; 55/337, 402, 406, 55/419, 447, 462
See application file for complete search history.

(56) References Cited

U.S. PATENT DOCUMENTS

| | | | |
|---|---|---|---|
| 6,709,477 B1* | 3/2004 | Håkansson | B01D 45/14 123/573 |
| 7,309,372 B2 | 12/2007 | Kahlbaugh et al. | |
| 7,314,497 B2 | 1/2008 | Kahlbaugh et al. | |
| 7,383,829 B2* | 6/2008 | Shieh | F01M 13/04 123/572 |
| 8,057,567 B2 | 11/2011 | Webb et al. | |
| 8,177,875 B2 | 5/2012 | Rogers et al. | |
| 8,268,033 B2 | 9/2012 | Rogers et al. | |
| 8,277,529 B2 | 10/2012 | Rogers et al. | |
| 8,336,529 B2* | 12/2012 | Nakajima | F01M 13/0416 123/572 |
| 8,460,424 B2 | 6/2013 | Rogers et al. | |
| 8,499,750 B2* | 8/2013 | Koyamaishi | F01M 9/02 123/196 A |
| 8,512,435 B2 | 8/2013 | Rogers et al. | |
| 8,641,796 B2 | 2/2014 | Rogers et al. | |
| 2002/0100464 A1 | 8/2002 | Fedorowicz et al. | |
| 2009/0313977 A1* | 12/2009 | Liu | F01M 13/04 60/297 |
| 2011/0056455 A1* | 3/2011 | Koyamaishi | F01M 9/02 123/196 A |
| 2011/0179755 A1* | 7/2011 | Gruhler | B29C 65/58 55/320 |
| 2012/0159912 A1* | 6/2012 | Ruppel | B01D 45/08 55/462 |
| 2013/0125865 A1* | 5/2013 | Kobayashi | F01M 13/0416 123/573 |
| 2013/0205726 A1* | 8/2013 | Wada | B01D 46/003 55/337 |

FOREIGN PATENT DOCUMENTS

| | | | |
|---|---|---|---|
| CN | 103249923 | 8/2013 | |
| DE | 3910559 A1 * | 10/1990 | B01D 45/06 |
| DE | 10 2010 032 539 | 2/2012 | |
| EP | 1 068 890 | 1/2001 | |
| JP | 53-5635 | 1/1978 | |
| JP | 62-93108 | 6/1987 | |
| JP | 6-18645 | 3/1994 | |
| JP | 9-250325 | 9/1997 | |
| JP | 11-107738 | 4/1999 | |
| JP | 11324636 A * | 11/1999 | |
| JP | 2001-200713 | 7/2001 | |
| JP | 2008-533348 | 8/2008 | |
| JP | 2010-248934 | 11/2010 | |
| WO | 2012/013534 | 2/2012 | |

OTHER PUBLICATIONS

Chinese Search Report issued Jun. 24, 2016 in corresponding Chinese Patent Application No. 201410819776.6.
European Search Report (ESR) issued Mar. 3, 2015 in parallel European Patent Application No. EP 14 00 3429.

* cited by examiner

Figure 1:
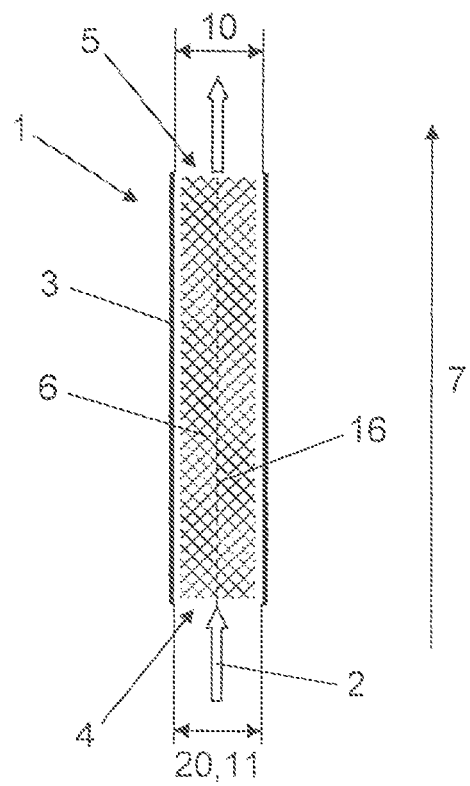

Fig. 1 (STATE OF THE ART)

OIL MIST SEPARATOR

BACKGROUND OF THE INVENTION

1. Field of the Invention

The invention concerns an oil mist separator for separating off liquid suspended particles from a carrier gas, in particular, a crankcase ventilation gas of an internal combustion engine, including a housing having at least one inlet opening for introduction of the carrier gas and at least one outlet opening for discharge of the filtered carrier gas, wherein arranged in the housing is at least one filter insert through which the carrier gas can flow along a flow direction.

2. Description of Related Art

It is known that in operation of an internal combustion engine so-called blow-by gases are produced, which are to be discharged from a crankcase of the internal combustion engine to avoid an increase in the pressure in the crankcase and to prevent unwanted escape of blow-by gas and oil contained therein. In the closed crankcase ventilation system, that crankcase venting gas or the carrier gas which includes oil and which results from the blow-by gases in the crankcase is recycled to an air inlet of the internal combustion engine, wherein the pressure in the crankcase is usually kept within predetermined component limit values. The carrier gas however contains fine oil droplets and solid particles of an order of magnitude of between about 0.1 μm and 10 μm.

To avoid negative effects of that oil which is contained in the carrier gas on components in the air inlet of the internal combustion engine, it is already known for the oil and the solid particles to be separated off from the carrier gas. For that purpose, inter alia, filter devices are used, which include filter inserts comprising a wire mesh or knitted wire mesh, through which the carrier gas can flow. By virtue of the underlying separation mechanisms and the structure-governed design configuration of such a wire mesh or knitted wire mesh, however, such filter devices achieve only a limited degree of separation when small drop or particle sizes are involved (in particular, in the particle size range of <1 μm). Therefore, it is possible to use, connected downstream of the filter device, a fine filter (for example, a coalescer filter) which can filter out smaller oil droplets than the separating filter.

Oil mist separators are known, for example, from CN 201198776 (Y), JP 2010-248934 (A), and JP 2001-200713 A.

BRIEF SUMMARY OF THE INVENTION

The object of the invention is to provide a filter device which is improved over the state of the art.

According to the invention, that object is attained by a filter device having the features described below. Advantageous configurations of the invention are recited in the appendant claims.

According to the invention, it is therefore provided that the at least one filter device can be arranged releasably in the oil mist separator, wherein a—preferably substantially peripherally extending—seal is provided preferably between a first fixing surface of the oil mist separator and a second fixing surface, to be fixed thereto, of the filter device.

It is possible in that way to avoid by-passing of the filter device by components of the carrier gas.

To increase a flow speed of the carrier gas and/or to achieve a prolonged—preferably labyrinth-like—flow path for the carrier gas through the at least one filter insert at least one guide device is provided by which the flow path can be deflected.

A guide device arranged along the flow direction provides for a reduction in the flow cross-section available to the carrier gas, to a correspondingly reduced cross-sectional area through which the carrier gas can flow. That cross-sectional reduction leads to an increased flow speed for the carrier gas and thus increased oil separation in the filter insert. Deflection of the carrier gas at the guide devices means that it is possible to implement increased oil separation, in particular, with a correspondingly increased flow speed for the carrier gas—of, for example, more than 0.9 m/s.

It can preferably be provided that the at least one guide device is in the form of a—preferably plate-shaped—baffle. In that case, the at least one guide device can be mounted to the housing, preferably by welding, adhesive or screwing, and can define at least one opening forming a cross-sectional area through which the carrier gas can flow. In that case, the cross-sectional area, which is formed by the at least one opening and through which the carrier gas can flow, can extend, in the case of the plate-shaped baffle, parallel to the plane of the plate. Particularly when using plate-shaped guide devices, the filter inserts can simply be inserted into the housing and do not necessarily themselves have to be joined or sealed to the housing.

In a preferred variant, it can be provided that the at least one filter insert is formed from a woven material, a mesh material, a knitted material, a fabric or a fleece made up of at least one filter wire or at least one filter fiber of a diameter of less than 0.2 mm, preferably less than 0.1 mm. With small drop sizes, the degree of separation of the filter insert depends on the diameter of the filter wires or the filter fibers. Small wire or fiber diameters increase the degree of separation provided by the filter insert.

It can preferably be provided that a proportion by volume of the at least one filter wire or the at least one filter fiber in the filter insert is between about 2% and 5%, preferably being substantially 4%. Depending on the respective choice of the proportion by volume of the filter wires or filter fibers, it is possible to influence the degree of separation provided by the filter insert. An increased proportion by volume, however, will cause an increased pressure drop across the filter insert. It is therefore appropriate, when dimensioning the proportion by volume of the filter wires or fibers and in dimensioning of the increased flow path caused by the at least one guide device, to take account of possibly predetermined limit values for a maximum pressure drop through the filter device.

Particularly effective separation of oil from the carrier gas can be achieved by the proposed dimensioning of the filter insert. Tests conducted by the applicant have shown that, with the proposed dimensioning, it is possible to bring about a great reduction in the mass of oil contained in the carrier gas, whereby the oil loading for downstream-connected fine filters like, for example, coalescer filters, can be considerably reduced. That increases the service life of the downstream-disposed fine filters which have to be regularly changed by virtue of their oil loading.

In a particularly preferred embodiment, it can be provided that the at least one filter wire or the at least one filter fiber at least partially and preferably substantially completely comprises metal, preferably high-quality steel or aluminum. In other words, therefore, it can be provided that the filter insert is formed from a metal mesh.

A particularly good filter action can be achieved if suitable dimensioning of the at least one guide device and thus the cross-sectional areas resulting therefrom and through which the carrier gas can flow in the at least one filter insert can provide an increased flow speed for the carrier gas of at least 0.6 m/s, preferably at least 0.9 m/s. The cross-sectional area through which the carrier gas can or does flow can, in that case, be a cross-sectional area which extends transversely to a flow path for the carrier gas through the filter insert and through which the carrier gas can flow through the filter insert.

Figure 6:
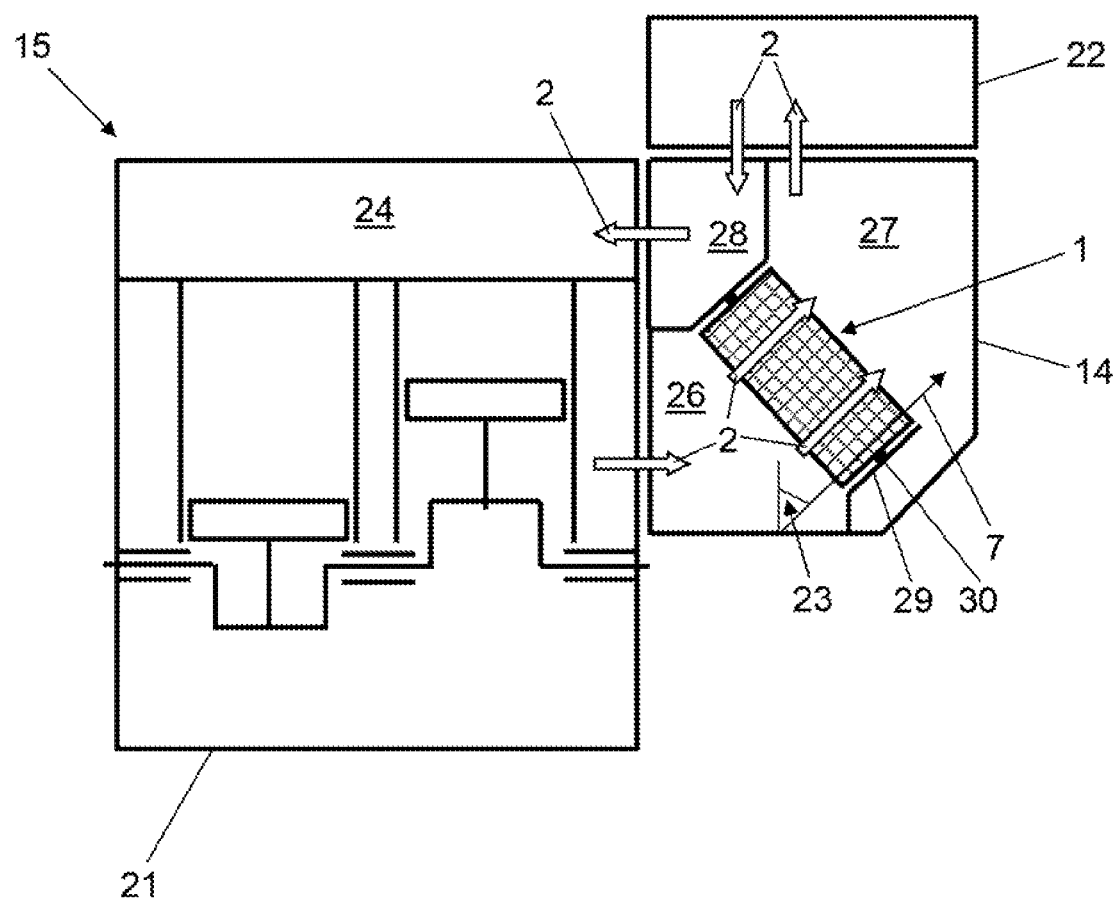

The increased flow speed of the carrier gas in the filter insert, that is caused by the arrangement and dimensioning of the guide devices, should however, be below the so-called flooding point of the filter insert, that is to say, below that speed as from which drops are carried out of the filter insert.

According to a preferred configuration, it can be provided that a plurality of filter inserts is arranged in succession along the flow direction. In that case, to achieve a prolonged, preferably labyrinth-like, flow path for the carrier gas through the plurality of filter inserts at least one guide device is arranged at least between two of the successively arranged filter inserts, preferably between all of the successively arranged filter inserts.

A preferred embodiment is that in which openings delimited by the guide devices are arranged in a mutually displaced relationship considered in the flow direction, wherein preferably the cross-sectional areas formed by the openings and through which the carrier gas can flow are of substantially equal size. The displaced arrangement of the openings of the respective guide devices provides a labyrinth-like structure in relation to the flow path of the carrier gas through the filter device, the labyrinth-like structure correspondingly increasing the length of the flow path. If the cross-sectional areas through which the carrier gas can flow are of substantially equal size, it is possible to achieve a carrier gas flow speed that remains the same, through the individual filter inserts.

Depending on the respective situation of use, however, it may also be appropriate to alter the cross-sectional areas through which the carrier gas can flow and thus the flow speed of the carrier gas along the flow path. Thus, for example, it can be provided that the flow speed is increased by dimensioning of the openings in the transition from the first filter insert to the second filter insert (considered in the flow direction) and to reduce it again on issuing from the second filter insert.

A variant which is particularly simple to manufacture from the structure point of view can provide that the housing is of a substantially cuboidal configuration, wherein the housing has a length, a width and a height. It can preferably be provided, in that case, that the length to width ratio is between about 1:1 and 1:2 and/or the length to height ratio is between about 2:1 and 3:1. Depending on the respective situation of use, the housing is equipped with filter inserts to a greater or lesser degree. It can thus be provided that the length of the housing in relation to an overall filter insert height of all filter inserts in the housing has a ratio of between about 2:1 and 10:1. In other words, it can certainly be provided that only a part of the housing height is also actually equipped with filter inserts—preferably starting from the at least one inlet opening of the housing—and the remainder of the housing remains empty.

Generally, it can be provided that an inlet area of the at least one inlet opening of the housing transversely relative to the flow direction and/or cross-sectional areas which are formed by guide devices and through which the carrier gas can flow transversely relative to the flow direction is or are at least 10% and/or a maximum 40%, preferably a maximum 30%, of an internal housing cross-section transversely relative to the flow direction. It is possible in that way to achieve an increased flow speed for the carrier gas and thus increased oil separation in the filter insert.

It can preferably be provided, in that case, that the at least one filter device is arranged inclinedly relative to the vertical, wherein the flow direction through the filter device includes, with the vertical, an angle of between about 30° and 90°, preferably substantially 45°. It is particularly desirable if an inlet opening of the filter device extends inclinedly relative to the vertical at least portion-wise in the mounted position, preferably as far as a lower end of the filter device in relation to the vertical. In that case, the inlet opening can preferably extend along a wall of the housing of the filter device, wherein a lower edge of the housing wall includes, with the vertical, an angle of between about 30° and 90°, preferably substantially 45°. It can preferably be provided, in that respect, that the guide devices in the filter device are also correspondingly arranged inclinedly relative to the vertical by, for example, extending parallel to the plane of the inlet opening.

Arranging the filter device of the oil mist separator, inclinedly relative to the vertical, means that it is also possible to achieve a specifically targeted discharge flow of the separated oil along the guide devices or baffles back to the inlet opening of the filter device on the raw gas side. In that case, the discharge flow can be effected along the guide devices by virtue of the force of gravity whereby the discharge flow characteristic can be improved as the oil return flow and the gas flow of the carrier gas extend separately from each other.

It can preferably be provided that the oil mist separator has a first housing chamber upstream of the at least one filter device in relation to a flow path of the carrier gas, which first housing chamber has an increased free flow area transversely relative to the flow path of the carrier gas in relation to an inlet area of the at least one inlet opening of the housing of the filter device. It can also be provided that the oil mist separator has a second housing chamber downstream of the at least one filter device in relation to a flow path of the carrier gas, which second housing chamber has an increased free flow area transversely relative to the flow path of the carrier gas in relation to an outlet area of the at least one outlet opening of the housing of the filter device.

In addition, an internal combustion engine preferably includes a proposed oil mist separator arranged at the crankcase thereof.

BRIEF DESCRIPTION OF THE DRAWINGS

Further details and advantages of the present invention are described by means of the specific description hereinafter.

FIG. 1 shows a diagrammatic sectional view through a filter device according to the state of the art, FIG. 2 shows a diagrammatic sectional view through an embodiment of a proposed filter device, FIG. 3 shows a view from below of the filter device of FIG. 2, FIG. 4 shows a diagrammatic sectional view through a further embodiment of a proposed filter device, FIG. 5 shows a perspective plan view of a further embodiment of a proposed filter device, and FIG. 6 shows a diagrammatic view of an internal combustion engine having a proposed oil mist separator which includes a proposed filter device.

DETAILED DESCRIPTION OF THE INVENTION

FIG. 1 is a diagrammatic sectional view of a filter device 1 according to the state of the art, including a housing 3 and a filter insert 6 arranged in the housing 3. The housing 3 of the filter device 1 has an inlet opening 4 for the introduction of a carrier gas 2 into the filter device 1 and an outlet opening 5 for discharge of the carrier gas 2 filtered by the filter insert 6 from the filter device 1. The flow of the carrier gas 2—from which liquid suspended particles like, for example, oil are to be separated off—through the filter insert 6 along a flow path 16 is indicated by a broken line. Starting from the inlet opening 4 towards the outlet opening 5, the carrier gas 2 flows through the filter device 1 along a flow direction 7. In this example, in transverse relationship with the flow direction 7, the housing 3 is of a substantially rectangular cross section so that there is a rectangular internal housing cross-section 10, transversely relative to the flow direction 7. Transversely relative to the flow direction 7, the inlet opening 4 of the housing 3 has an inlet area 20 which is also rectangular and which corresponds to a cross-sectional area 11 through which the carrier gas 2 can flow.

Figure 2:
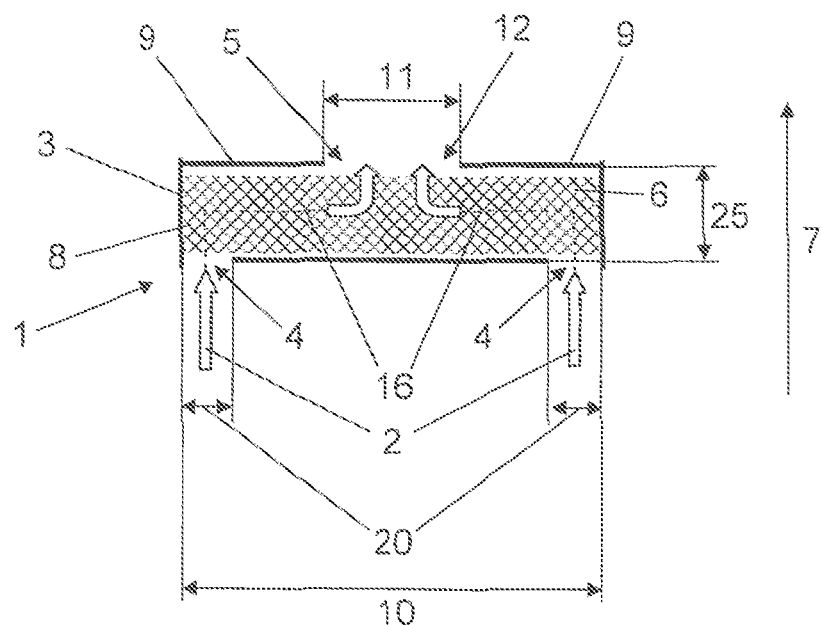

FIG. 2 shows a diagrammatic sectional view through an embodiment of a proposed filter device 1 for separating off oil from an oil mist or carrier gas 2. The filter device 1 includes a housing 3 in which a filter insert 6 is arranged. In this example, the filter insert 6 is formed from a wire mesh of high-quality steel wires, wherein the filter wires 8 of the wire mesh are of a wire diameter of less than 0.2 mm, preferably less than 0.1 mm. In this example, the housing 3 has two inlet openings 4 which, transversely relative to the flow direction 7, form, in total, an inlet area 20 through which the carrier gas 2 can pass into the housing 3 and can flow through the filter insert 6 along the flow paths 16. Two guide devices 9, which are arranged on the housing 3 downstream of the filter insert 6 as considered in the flow direction, delimit an opening 12 which, in this example, corresponds to the outlet opening 5 of the housing 3, through which the carrier gas 2 can issue from the filter device 1.

The flow speed of the carrier gas 2 can be influenced by the choice of suitable sizes of the inlet openings 4 and thus by the choice of a suitable inlet area 20, wherein preferably the inlet openings 4 or the inlet area 20 are selected such that the flow speed of the carrier gas 2 through the filter insert 6 is at least 0.6 m/s, preferably at least 0.9 m/s. The thickness of the filter insert 6 or the spacing 25 between inlet openings 4 and guide devices 9 considered in the flow direction 7 is selected, in this example, such that the resulting cross-sectional area through which the carrier gas 2 can flow, transversely relative to the flow path 16 through the filter insert 6, is substantially half as large as the inlet area 20 formed by the two inlet openings 4. The cross-sectional area 11 which is formed by the opening 12 or the outlet opening 5 and through which the carrier gas 2 can flow is, in this example, selected to be of substantially the same size as the inlet area 20 (formed by the two inlet openings 4) so that a flow speed for the carrier gas 2, that remains substantially the same, is set along the flow paths 16 through the filter insert 6.

Figure 3:
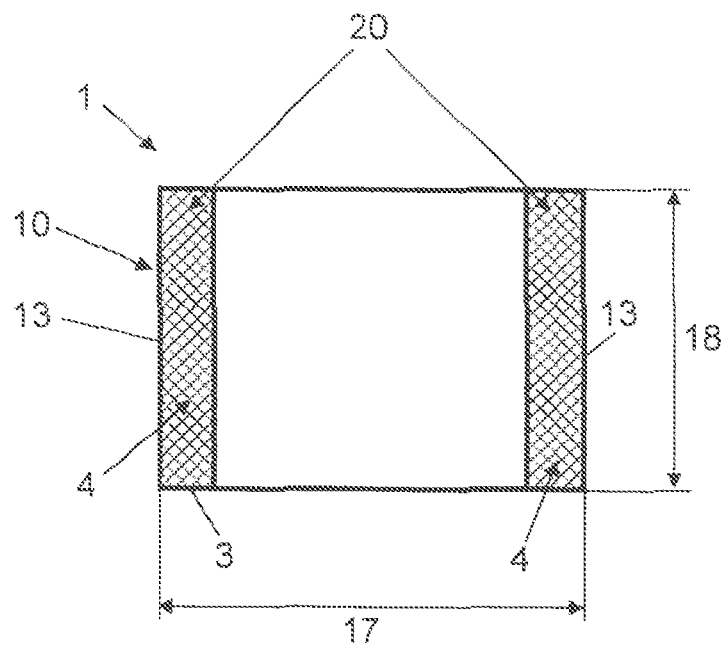

FIG. 3 shows a view from below of the filter device 1 of FIG. 2. As can be seen from this view, the base surface of the housing 3 of this embodiment of the filter device 1 is of a rectangular configuration with a length 17 and a width 18. The inlet openings 4 through which the carrier gas 2 can flow into the filter device 1 extend, in this example, along two walls 13 of the housing 3 and extend over the entire width 18 of the housing 3. In total, the two inlet openings 4 form an inlet area 20 through which the carrier gas 2 can flow into the filter device 1.

Figure 4:
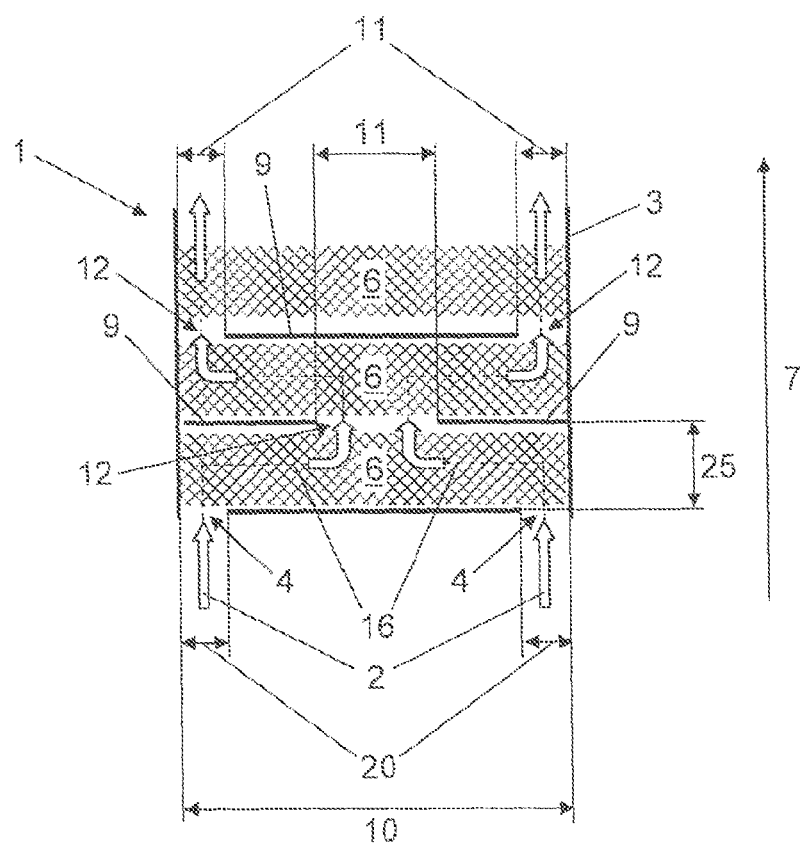

FIG. 4 shows a diagrammatic sectional view of a further embodiment of a proposed filter device. In this case, in comparison with the embodiment of FIG. 2, a plurality of filter inserts 6 is arranged in succession in the flow direction 7. Arranged on the housing 3 between the filter inserts 6 are guide devices 9 by which the flow paths 16 of the carrier gas 2 flowing through the filter inserts 6 are respectively correspondingly deflected. The guide devices 9—which are arranged substantially perpendicularly to the flow direction 7—form, in this arrangement, respective openings 12 which are disposed in a mutually displaced relationship as viewed in the flow direction 7. Overall, that results in a labyrinth-like structure whereby the flow paths 16 are correspondingly prolonged. In this example, all resulting cross-sectional areas 11 through which the carrier gas 2 can flow and also the inlet area 20 of the inlet openings 4 are of substantially equal sizes whereby this gives a flow speed that remains substantially the same for the carrier gas 2 along a flow path 16. Depending on the respective situation of use, however, it may also be desirable for the cross-sectional areas 11 through which the carrier gas 2 can flow and therewith the flow speed of the carrier gas 2 along the flow path 16 to be altered. Thus, for example, it can be provided that the flow speed is increased by the dimensioning of the openings 12 at the transition to the second filter insert 6 (considered in the flow direction 7) and is reduced again on issuing from the second filter insert 6.

In the illustrated example, the guide devices 9 between two respective filter inserts 6 are arranged at a spacing 25 in the flow direction 7 on the housing 3. By a suitable choice of inlet area 20, cross-sectional areas 11 through which the carrier gas 2 can flow and spacings 25 between the guide devices 9, it is possible to influence the flow speed of the carrier gas 2 with a given volume flow of the carrier gas 2. Depending on the respective situation of use, like, for example, an internal combustion engine to be equipped with a filter device 1, it is therefore possible to adapt the values, which are structurally particularly simple to influence, for the inlet area 20, the cross-sectional areas 11 through which the carrier gas 2 can flow and the spacings 25, to achieve an optimum filter action. In particular, by matching adaptation of those values, it is possible to provide filter devices 1 for a broad range of different internal combustion engines which can all involve the same external casing dimensions.

Figure 5:
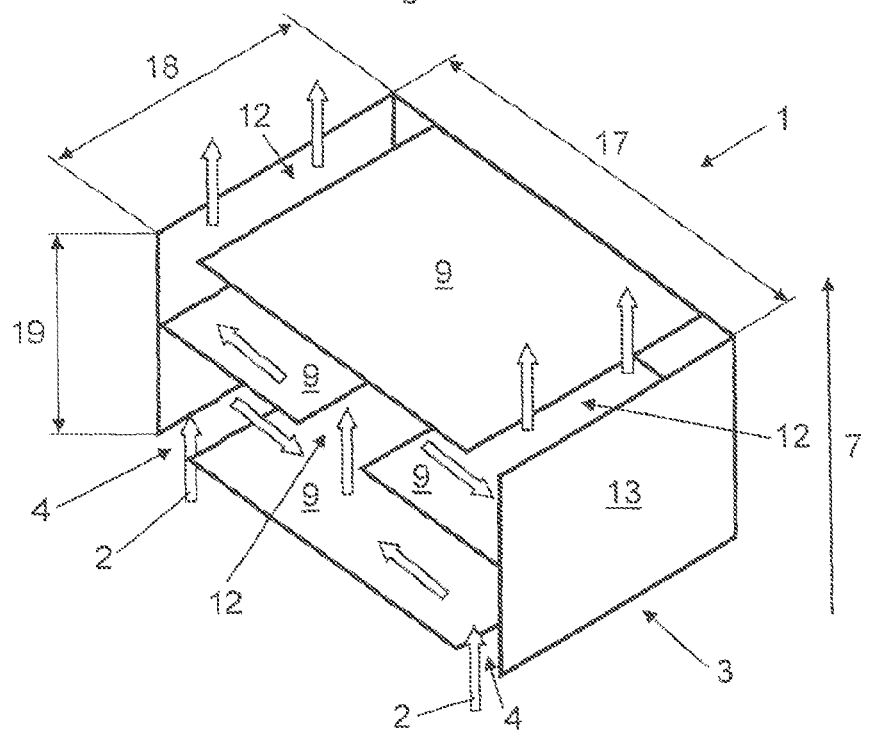

FIG. 5 shows a perspective view from above of a further example of a proposed filter device 1 similar to FIG. 4. For the sake of clarity in this case, the filter inserts 6 and a front end wall of the housing 3 have been omitted. As can be seen from the drawing, the inlet openings 4 and the openings 12 delimited by the guide devices 9 extend substantially along the total width 18 of the housing 3. It is also possible to clearly see the labyrinth-like internal structure of the filter device 1, that is achieved by the guide devices 9.

FIG. 6 shows a diagrammatic view of an internal combustion engine 15, on the crankcase 21 of which is arranged a proposed oil mist separator 14 having a proposed filter device 1. The internal combustion engine 15 can be, for example, a gas engine in which a charge air is introduced by way of an air inlet 24 in a known manner. Blow-by gas or carrier gas 2 which occurs in the crankcase 21 of the internal combustion engine 15 is passed into the oil mist separator 14. Downstream of the oil mist separator 14 which is used as a pre-filter, the carrier gas 2 passes into a fine filter 22 in order to remove from the carrier gas 2 smaller oil droplets which cannot be separated out by the oil mist separator 14. Downstream of the fine filter 22, the carrier gas is recycled into the air inlet 24 and thus returned to the charge air by way of a separated chamber 28 of the oil mist separator 14. The flow of the carrier gas 2 takes place along that flow path by virtue of the pressure conditions obtained in the air inlet 24.

Arranged in the oil mist separator 14 is a filter device 1 through which the carrier gas 2 flows along a flow direction 7. In this case, an oil contained in the carrier gas 2 is at least partially separated off. By virtue of a suitably inclined arrangement of the filter device 1 so that the flow direction 7 through the filter device 1 is inclined at an angle 23 relative to the vertical, the oil which is separated out in the filter device 1 can be discharged in specifically targeted fashion, for example, at one of the inlet openings 4 of the filter device 1. In the illustrated example, the angle 23 is about 45° relative to the vertical.

Upstream and downstream of the filter device 1, the oil mist separator 14 shown here has calming zones for the carrier gas 2 in the form of a first housing chamber 26 and a second housing chamber 27. Both the first housing chamber 26 and also the second housing chamber 27 respectively have a free flow area which is increased in comparison with the inlet area 20 of the at least one inlet opening 4 of the filter device 1 and the outlet area of the at least one outlet opening 5 of the filter device 1 respectively, transversely relative to the flow path of the carrier gas. By virtue of the flow speed of the carrier gas 2 being reduced in that way, it is possible on the one hand for large oil drops to be already separated out of the carrier gas 2 upstream of the filter device 1 in the first housing chamber 26, while on the other hand oil drops in the second housing chamber 27 downstream of the filter device 1 are not entrained by an excessively high flow speed of the carrier gas 2.

Subsequently, the carrier gas 2, which is pre-filtered in the oil mist separator 14, is fed to the fine filter 22, whereupon it is recycled to the air inlet 24 of the internal combustion engine 15 by way of a third housing chamber 28 of the oil mist separator 14.

In the oil mist separator 14, a—preferably substantially peripherally extending—seal 30 is provided preferably between a first fixing surface 29 of the oil mist separator 14 and a second fixing surface, to be fixed thereto, of the filter device 1.

The invention claimed is:

1. An oil mist separator for separating off oil contained in a carrier gas, comprising at least one filter device for separating off liquid suspended particles from the carrier gas, including a housing having at least one inlet opening for introduction of the carrier gas and at least one outlet opening for discharge of the carrier gas which has been filtered, wherein at least two filter inserts through which the carrier gas can flow along a flow direction are arranged in succession along the flow direction in the housing, wherein at least one guide device by which a flow path of the carrier gas can be deflected is arranged inside or between the at least two filter inserts, perpendicular to the flow direction and has at least one opening through which the carrier gas can flow from a first of the at least two filter inserts to a second of the at least two filter inserts, the at least one guide device being provided so as to increase a flow speed of the carrier gas and to achieve a prolonged flow path for the carrier gas through the at least two filter inserts, wherein the at least one filter device can be arranged releasably in the oil mist separator, and wherein a seal is provided between a first fixing surface of the oil mist separator and a second fixing surface, to be fixed thereto, of the at least one filter device.

2. The oil mist separator as set forth in claim 1, wherein the at least one guide device is in the form of a baffle.

3. The oil mist separator as set forth in claim 1, wherein the at least one guide device is mounted to the housing.

4. The oil mist separator as set forth in claim 1, wherein each of the at least two filter inserts is formed from a woven material, a mesh material, a knitted material, a fabric or a fleece made up of at least one filter wire or at least one filter fiber of a diameter of less than 0.2 mm.

5. The oil mist separator as set forth in claim 4, wherein the diameter is less than 0.1 mm.

6. The oil mist separator as set forth in claim 4, wherein a proportion by volume of the at least one filter wire or the at least one filter fiber in each of the at least two filter inserts is between about 2% and 5%.

7. The oil mist separator as set forth in claim 1, wherein the at least one guide device comprises a plurality of guide devices, and openings delimited by the plurality of guide devices are arranged in mutually displaced relationship in the flow direction.

8. The oil mist separator as set forth in claim 7, wherein cross-sectional areas formed by the openings and through which the carrier gas can flow are of equal size.

9. The oil mist separator as set forth in claim 1, wherein the housing is cuboidal.

10. The oil mist separator as set forth in claim 9, wherein the housing has a length, a width and a height, wherein the length to width ratio is between about 1:1 and 1:2 and/or the length to height ratio is between about 2:1 and 3:1.

11. The oil mist separator as set forth in claim 1, wherein the at least one guide device comprises a plurality of guide devices, and an inlet area of the at least one inlet opening of the housing transversely relative to the flow direction and/or cross-sectional areas which are formed by the plurality of guide devices and through which the carrier gas can flow transversely relative to the flow direction is or are at least 10% and/or at a maximum 40% of an internal housing cross section transversely relative to the flow direction.

12. The oil mist separator as set forth in claim 11, wherein the at least one filter device is arranged inclinedly relative to a vertical, wherein the flow direction through the at least one filter device includes, with the vertical, an angle of between about 30° and 90°.

13. The oil mist separator as set forth in claim 12, wherein the angle is 45°.

14. The oil mist separator as set forth in claim 11, wherein the maximum is 30% of the internal housing cross section transversely relative to the flow direction.

15. The oil mist separator as set forth in claim 1, wherein the at least one inlet opening of the at least one filter device extends inclinedly relative to a vertical at least portion-wise in a mounted position.

16. The oil mist separator as set forth in claim 1, wherein the oil mist separator has a first housing chamber upstream of the at least one filter device in relation to the flow path of the carrier gas, the first housing chamber having an increased free flow area transversely relative to the flow path of the carrier gas in relation to an inlet area of the at least one inlet opening of the housing of the at least one filter device.

17. The oil mist separator as set forth in claim 1, wherein the oil mist separator has a second housing chamber downstream of the at least one filter device in relation to the flow path of the carrier gas, the second housing chamber having an increased free flow area transversely relative to the flow path of the carrier gas in relation to an outlet area of the at least one outlet opening of the housing of the at least one filter device.

18. An internal combustion engine, comprising an oil mist separator as set forth in claim 1.

19. The oil mist separator as set forth in claim 18, wherein the oil mist separator is arranged at a crankcase of the internal combustion engine.

20. The oil mist separator as set forth in claim 1, wherein the seal extends along a periphery of the at least one filter device.

\* \* \* \* \*